US010968401B2

(12) United States Patent
Collins, Jr. et al.

(10) Patent No.: US 10,968,401 B2
(45) Date of Patent: Apr. 6, 2021

(54) DESALTER/DEHYDRATOR SYSTEM

(71) Applicant: FORUM US, INC, Houston, TX (US)

(72) Inventors: Merlin Thomas Collins, Jr., Huffman, TX (US); James Eugene Batchelor, Palestine, TX (US); Jonathan Carter Boul, Cypress, TX (US)

(73) Assignee: FORUM US, INC., Houston, TX (US)

( * ) Notice: Subject to any disclaimer, the term of this patent is extended or adjusted under 35 U.S.C. 154(b) by 711 days.

(21) Appl. No.: 14/827,919

(22) Filed: Aug. 17, 2015

(65) Prior Publication Data
US 2016/0060546 A1 Mar. 3, 2016

Related U.S. Application Data

(60) Provisional application No. 62/043,345, filed on Aug. 28, 2014.

(51) Int. Cl.
*C10G 33/02* (2006.01)
*C10G 33/08* (2006.01)
*B01D 17/06* (2006.01)
*B01D 17/04* (2006.01)
*B03C 11/00* (2006.01)
*C10G 31/08* (2006.01)

(52) U.S. Cl.
CPC ............ *C10G 33/02* (2013.01); *B01D 17/04* (2013.01); *B01D 17/06* (2013.01); *B03C 11/00* (2013.01); *C10G 31/08* (2013.01); *C10G 33/08* (2013.01); *B03C 2201/02* (2013.01)

(58) Field of Classification Search
CPC .......... C10G 33/02; B01D 17/06; C02F 1/463
USPC ................................................ 205/661, 555
See application file for complete search history.

(56) References Cited

U.S. PATENT DOCUMENTS

| 2,880,158 | A | * | 3/1959 | Turner | B01D 11/0419 204/674 |
| 4,182,672 | A | * | 1/1980 | Martin | B01D 17/06 204/662 |
| 4,252,631 | A | * | 2/1981 | Hovarongkura | B01D 17/06 204/666 |
| 4,374,724 | A |   | 2/1983 | Robinson | |
| 4,400,253 | A |   | 8/1983 | Prestridge et al. | |
| 4,511,452 | A | * | 4/1985 | Robinson | B01D 17/06 204/662 |
| 4,702,815 | A |   | 10/1987 | Prestridge et al. | |
| 4,734,724 | A |   | 3/1988 | Braunschweig et al. | |

(Continued)

FOREIGN PATENT DOCUMENTS

SU       1039954 A1  *  9/1983

OTHER PUBLICATIONS

Machine translation of SU1039954A1, published in 1983. (Year: 1983).*

(Continued)

*Primary Examiner* — Brian W Cohen
(74) *Attorney, Agent, or Firm* — Patterson + Sheridan, LLP

(57) ABSTRACT

A desalter/dehydrator system that comprises a pressure vessel, and first and second distribution headers disposed within the pressure vessel. The first distribution header is configured to inject an oil/water emulsion at a location within an electric field generated within the pressure vessel. The second distribution header is configured to inject the oil/water emulsion at a location below an electric field generated within the pressure vessel.

8 Claims, 4 Drawing Sheets

(56) References Cited

U.S. PATENT DOCUMENTS

| | | | |
|---|---|---|---|
| 4,804,453 A | 2/1989 | Sublette et al. | |
| 6,171,465 B1 | 1/2001 | Compton | |
| 7,008,536 B2 | 3/2006 | Varadaraj et al. | |
| 8,540,863 B2* | 9/2013 | Mothersbaugh | C02F 1/008 204/555 |
| 2002/0020631 A1* | 2/2002 | Gavrel | C02F 1/463 205/752 |
| 2003/0217971 A1* | 11/2003 | Varadaraj | B01D 17/045 210/639 |
| 2004/0094421 A1 | 5/2004 | Sams | |
| 2009/0015942 A1 | 1/2009 | Mihara et al. | |
| 2009/0159426 A1* | 6/2009 | Chen | B01D 17/06 204/167 |
| 2013/0024026 A1 | 1/2013 | Prasad et al. | |
| 2013/0126357 A1* | 5/2013 | Sams | B03C 11/00 204/573 |
| 2014/0042028 A1* | 2/2014 | Sams | B03C 11/00 204/559 |
| 2015/0290559 A1 | 10/2015 | Collins, Jr. et al. | |

OTHER PUBLICATIONS

Brazilian Preliminary Office Action dated Oct. 1, 2019 in corresponding Application No. BR102015020730-1.
Gulf Cooperation Council Examination Report dated Mar. 12, 2018, corresponding to Application No. GC 2015-29955.
Gulf Cooperation Council Examination Report dated Jan. 1, 2019, corresponding to Application No. GC 2015-29955.
Brazilian Office Action dated May 6, 2020 for Application No. BR102015020730-1.
Gulf Cooperation Examination Report dated Mar. 12, 2018 for Application No. 2015-29955.
Gulf Cooperation Second Examination Report dated Jan. 9, 2019 for Application No. 2015-29955.
Mexico Office Action dated May 30, 2019 for Application No. MX/a/2015/011322.

* cited by examiner

DESALTER/DEHYDRATOR SYSTEM

CROSS-REFERENCE TO RELATED APPLICATION

This application claims benefit of U.S. Provisional Patent Application Ser. No. 62/043,345, filed Aug. 28, 2014, which is incorporated herein by reference in its entirety.

BACKGROUND

Field of the Disclosure

Embodiments of the present disclosure generally relate to desalter and dehydrator systems.

Description of the Related Art

Salts (such as sodium chloride, calcium chloride, magnesium chloride, etc.) which can be present in crude oil can cause corrosion in piping and machinery used in oil refining processes. Desalting of a crude oil feedstock is therefore one of the initial steps performed during an oil refining process. A desalter system is used to remove salts and other water soluble impurities contained within crude oil. A dehydrator system operates in a similar manner as a desalter system and is used to remove water contained within a crude oil feedstock to provide a dehydrated crude oil stream.

Crude oil received at a refinery commonly includes residual water therein. Many of the salts and other water soluble impurities are dissolved within this residual water in the crude oil. Removing the residual water from the crude oil effectively removes the salts and other water soluble impurities from the crude oil. To remove the residual salt water from the crude oil, fresh water is mixed with the crude oil to create an oil/water mixture, referred to herein as an oil/water emulsion, which is then pumped into a pressure vessel of the desalter/dehydrator system. The fresh water is mixed with the crude oil to ensure that there is enough water dispersion to dissolve all of the salts, etc., therein.

When in the pressure vessel, the oil/water emulsion is subjected to a high voltage electric field (generated by one or more electric grids) where water droplets within the oil/water emulsion coalesce into larger droplets. Since the density of water is greater than the density of crude oil, once the water droplets within the oil/water emulsion reach a mass having a surface area to volume ratio at which friction of adjacent oil is overcome by gravity acting on the mass, the water droplets will separate from the crude oil and settle at the bottom of the desalter/dehydrator system. The crude oil and the water are then removed separately from the pressure vessel.

Current desalter/dehydrator systems have an inlet header through which the oil/water emulsion is pumped. The inlet header distributes the oil/water emulsion along a manifold that is fixed at a location within the pressure vessel to inject the oil/water emulsion into the pressure vessel. However, certain types of crude oils are easier to desalt/dehydrate when they are injected into the pressure vessel at a location between the high voltage electric grids, whereas other types of crude oils are easier to desalt/dehydrate when injected into the pressure vessel at a location below the high voltage electric grids. To handle desalting/dehydrating of different types of crudes oils efficiently, oil refinery operators are forced to build one or the other desalter/dehydrator system. One desalter/dehydrator system that is configured to inject the oil/water emulsion into the pressure vessel at a location therein between the high voltage electric grids or the other desalter/dehydrator system that is configured to inject the oil/water emulsion into the pressure vessel at a location therein below the high voltage electric grids.

Therefore, there is a need for methods and apparatus for injecting oil/water emulsions into a pressure vessel of desalter and dehydrator systems at multiple locations within the pressure vessel.

SUMMARY OF THE INVENTION

A desalter/dehydrator system comprising a pressure vessel; a first distribution header disposed within the pressure vessel and configured to inject an oil/water emulsion at a location within an electric field generated within the pressure vessel; and a second distribution header disposed within the pressure vessel and configured to inject the oil/water emulsion at a location below the electric field generated within the pressure vessel.

BRIEF DESCRIPTION OF THE DRAWINGS

So that the manner in which the above recited features can be understood in detail, a more particular description of the embodiments, briefly summarized above, may be had by reference to embodiments, some of which are illustrated in the appended drawings. It is to be noted, however, that the appended drawings illustrate only typical embodiments and are therefore not to be considered limiting of its scope, for the embodiments may admit to other equally effective embodiments.

DETAILED DESCRIPTION

Figure 1:
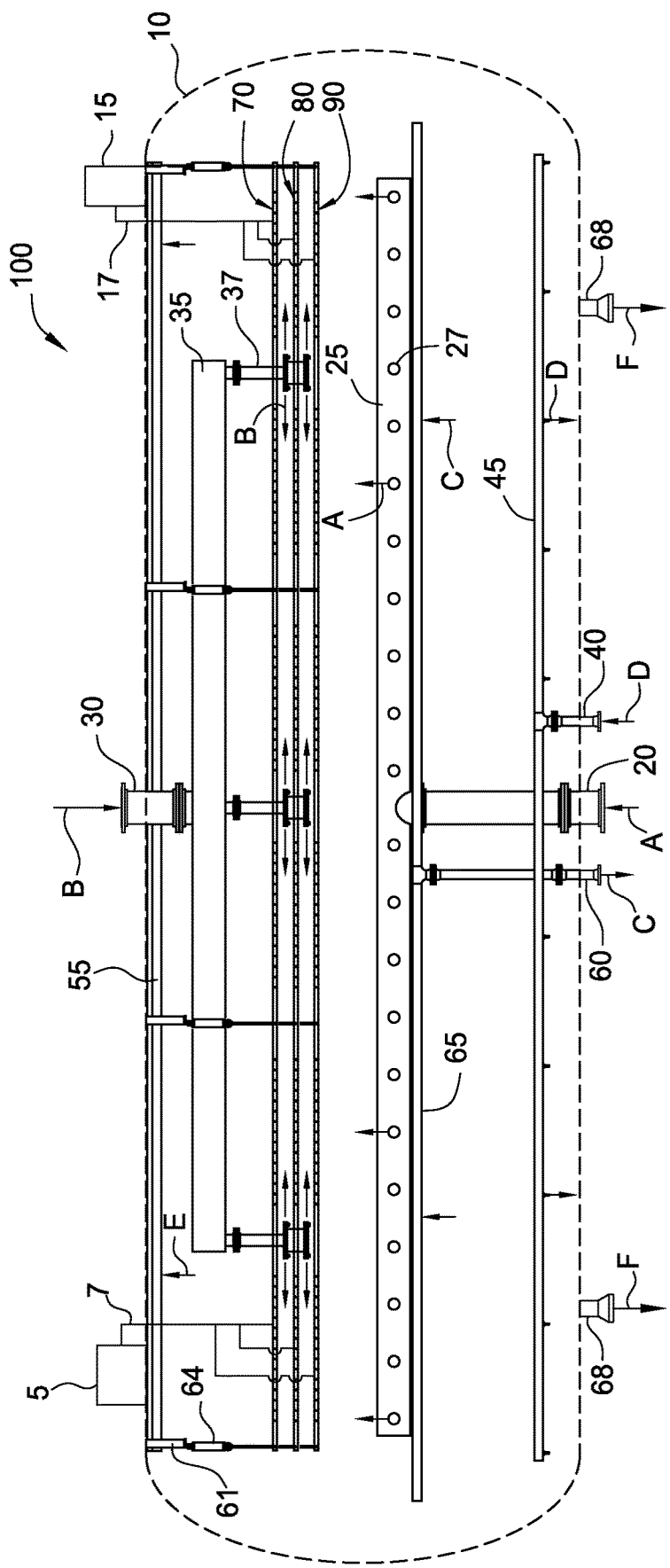
FIG. 1 illustrates a side view of a desalter/dehydrator system, with the outer walls of the pressure vessel shown in phantom to show the interior features thereof, according to one embodiment disclosed herein.

FIG. 1 illustrates a side view of a desalter/dehydrator system 100 for removing various contaminants from crude oil during an oil production/refining process, with the outer walls shown in phantom, according to one embodiment. The contaminants may include water and various salts, such salts including sodium chloride, calcium chloride, magnesium chloride, etc. If not removed from the crude oil, these contaminants can cause corrosion or other damage to the piping and machinery used in the refining or production process located fluidly downstream from the desalter/dehydrator system.

Figure 4:
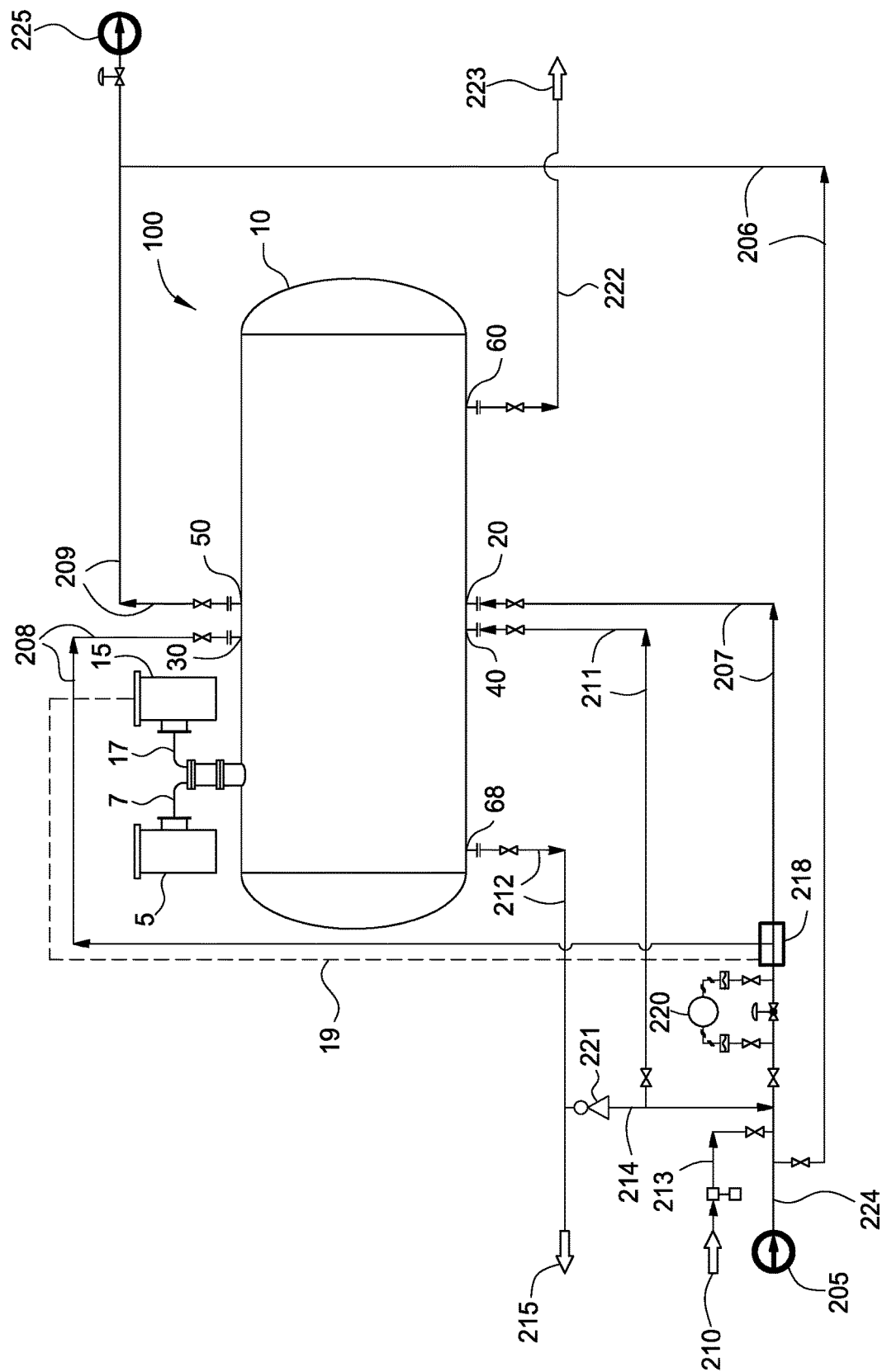
FIG. 4 is a schematic view of process piping and valving disposed upstream and downstream of the desalter/dehydrator system.

The system 100 includes a pressure vessel 10 into which an oil/water emulsion is injected. The pressure vessel 10 may comprise an elongated cylindrical housing having domed ends, although other shapes and sizes are contemplated. The pressure vessel 10 provides an enclosure for supporting the components of the system 100, headers, flanges, and related connections and openings for interconnecting the pressure vessel 10 to various piping upstream and downstream of the pressure vessel 10 (as illustrated in FIG. 4), and enables the fluid contents of the pressure vessel 10 to be maintained at pressures other than ambient atmospheric pressure. The pressure vessel 10 includes inlets and outlets to inject fluids, and remove fluids and separated solids, from the pressure vessel 10 during operation and/or maintenance as described below.

The desalter/dehydrator system 100 of FIG. 1 has a first fluid inlet 20 extending through a bottom or lower surface of the pressure vessel 10, and a first distribution header 25 disposed in the pressure vessel 10 that is in fluid communication with the first fluid inlet 20. The first distribution header 25 has a plurality of injection ports 27 therein, through which fluid is injected into the pressure vessel 10 via the injection ports 27 extending along the first distribution header 25 within the pressure vessel 10. An oil/water emulsion, identified by reference arrow A shown in FIG. 1, is supplied through the first fluid inlet 20, distributed by the first distribution header 25, flowed through the injection ports 27, and injected into the pressure vessel 10 in a substantially vertical direction (e.g. due to the buoyancy of the oil/water emulsion injected by the injection ports 27, which flows upward in a substantially vertical direction when injected into the pressure vessel 10) below a plurality of electrodes 70, 80, 90.

The system 100 also has a second fluid inlet 30 extending through a top or upper surface of the pressure vessel 10, and a second distribution header 35 disposed in the pressure vessel 10 that is in fluid communication with the second fluid inlet 30. One or more distribution injectors 37 extend from, and are in fluid communication with, the second distribution header 35 to inject fluid distributed along the second distribution header 35 into the pressure vessel 10 through the distribution injectors 37. An oil/water emulsion, identified by reference arrow B shown in FIG. 1, is supplied through the second fluid inlet 30, distributed by the second distribution header 35 into the distribution injectors 37, and flowed into the pressure vessel 10 in a substantially horizontal direction by the distribution injectors 37.

Each distribution injector 37 includes one or more tubular members that are coupled to, and in fluid communication with, the second distribution header 35. The distribution injectors 37 have one or more openings extending into the pressure vessel 10 which are disposed radially about the circumference of the tubular members for injecting the oil/water emulsion into the pressure vessel 10. The distribution injectors 37 are arranged to inject the oil/water emulsion into the pressure vessel 10 in a substantially radial direction from each distribution riser 37, and in a horizontal direction in the pressure vessel 10 between any of a plurality of electrodes 70, 80, 90 as shown by reference arrows B exiting the distribution injectors 37 in FIG. 1. Although only three distribution injectors 37 are illustrated in FIG. 1, any number of distribution injectors 37 (one or more) may be used with the embodiments of the system 100.

Oil/water emulsions having the same or different physical properties, such as water content and/or salinity level, can be injected into the pressure vessel 10 by selectively pumping the oil/water emulsions either through the first fluid inlet 20, the first distribution header 25, and the injection ports 27, or through the second fluid inlet 30, the second distribution header 35, and the distribution injectors 37. Additionally, an oil/water emulsion can be injected into the pressure vessel 10 by pumping the oil/water emulsion through the first fluid inlet 20, the first distribution header 25, and the injection ports 27, while simultaneously injecting the same or a different oil/water emulsion into the pressure vessel 10 by pumping the oil/water emulsion through the second fluid inlet 30, the second distribution header 35, and the distribution injectors 37. Various factors, such as the impurity content of the oil/water emulsion, the size of the pressure vessel 10, the size and number of electrodes, the increase and/or decrease of the voltage (volts) and/or current (amperage) across the plurality of electrodes 70, 80, 90 (which can occur for example when a ground path is formed by the water within the pressure vessel 10 between the plurality of electrodes 70, 80, 90 and the walls of the pressure vessel 10, or the arrangement of the internal piping connections, such as those between the first and second fluid inlets 20, 30 and the first and second distribution headers 25, 35 within the pressure vessel 10, etc.), may determine whether an operator manually and/or a control unit 15 of the system 100 automatically actuates a flow control device 218 (illustrated in FIG. 4) to direct an oil/water emulsion through the first fluid inlet 20, the second fluid inlet 30, or simultaneously through both the first and second fluid inlets 20, 30.

The oil/water emulsions are exposed to one or more electric fields generated within the pressure vessel 10 by a first plurality of electrodes 70, a second plurality of electrodes 80, and a third plurality of electrodes 90. An alternating current or direct current voltage supplied by a power source 5 is applied to the first, second, and third plurality of electrodes 70, 80, 90 via a communication line 7 to generate high voltage electric fields between the first, second, and third plurality of electrodes 70, 80, 90. An electric field may be generated by forming an electric potential difference, e.g. a difference in voltage, between the first and second plurality of electrodes 70, 80, and/or an electric potential difference formed between the second and third plurality of electrodes 80, 90. Although only one power source 5 and one communication line 7 from the power source 5 are shown in FIG. 1, any number of power sources and communication lines can be used to supply power to any of the first, second, and third plurality of electrodes 70, 80, 90 simultaneously and/or independently.

Figure 2:
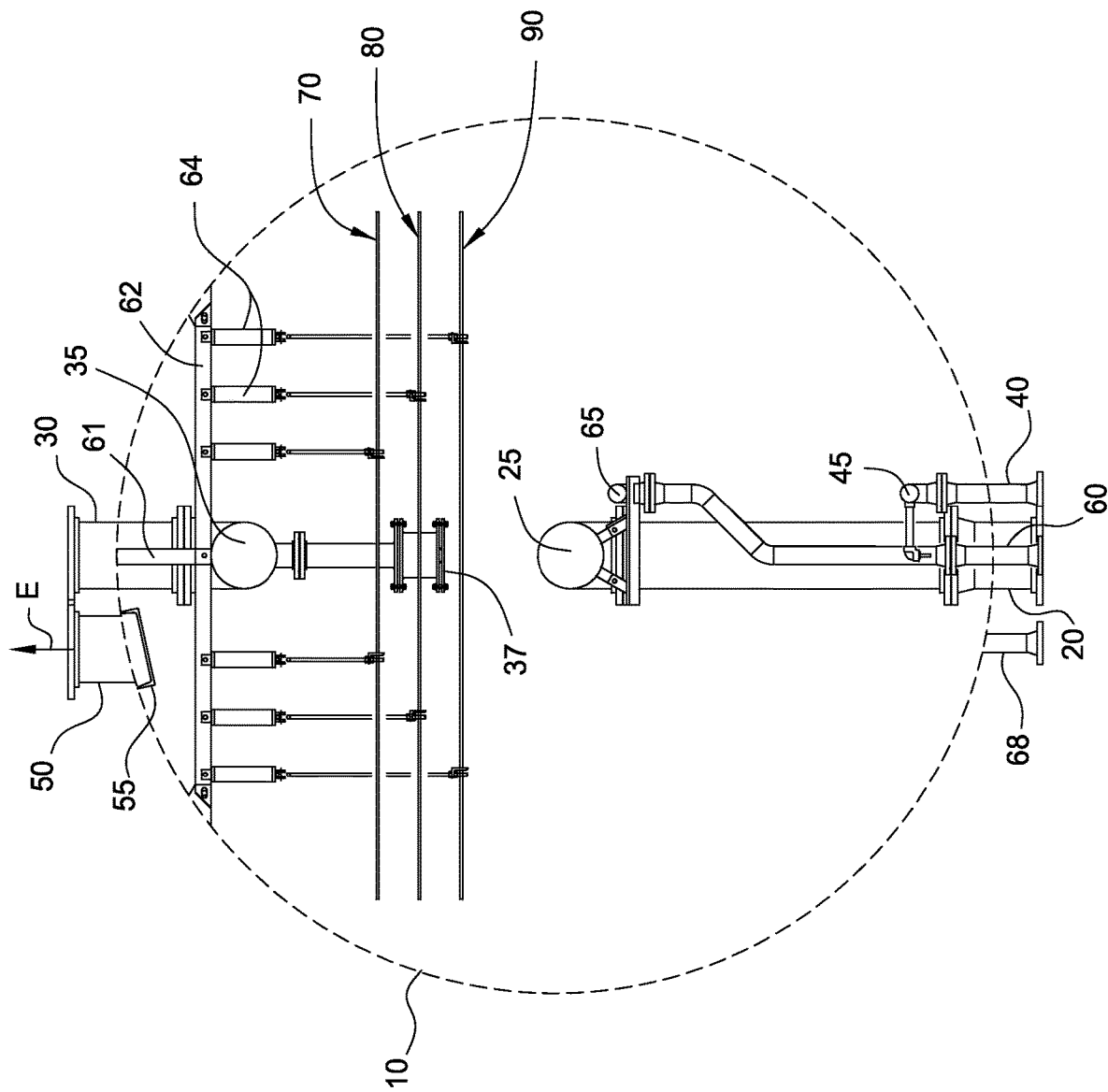
FIG. 2 illustrates an end view of the desalter/dehydrator system, according to the embodiment of FIG. 1 disclosed herein with the outer walls of the pressure vessel shown in phantom to show the interior features thereof.
Figure 3:
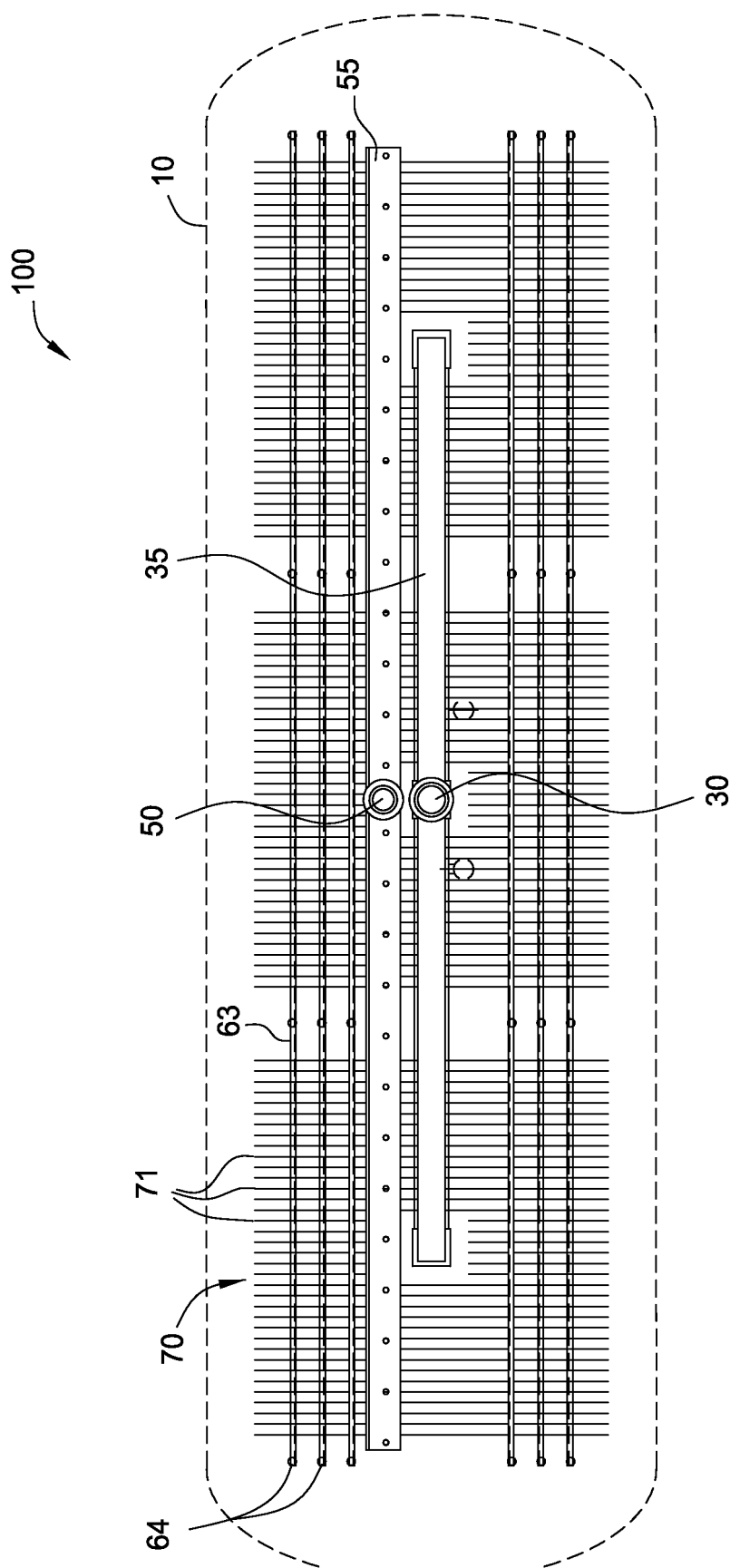
FIG. 3 illustrates a plan view of an electrode grid of the desalter/dehydrator system, according to the embodiment of FIG. 1 disclosed herein with the outer walls of the pressure vessel shown in phantom to show the interior features thereof.

The first, second, and third plurality of electrodes 70, 80, 90 are supported within the pressure vessel 10, such as by being secured and thus suspended from the ceiling of the pressure vessel 10 by one or more vertical support members 64, 61 and one or more horizontal support members 62, 63 as illustrated in FIGS. 1, 2 and 3. Each of the first, second, and third plurality of electrodes 70, 80, 90 comprise a plurality of metallic plate-type or rod-type members coupled together in a substantially horizontal plane. Although only three pluralities of electrodes are shown, any number of electrodes (one or more) may be used with the embodiments of the system 100.

FIG. 3 illustrates a plan view of the first plurality of the electrodes 70 positioned within the pressure vessel 10 and located below the second distribution header 35 with the remaining components within the pressure vessel 10 removed for clarity. As illustrated in FIG. 3, the first plurality of electrodes 70 comprise multiple plate-type or rod-type members 71 that are spaced apart along the longitudinal length of the pressure vessel 10 and disposed on the horizontal support members 63, which are in turn coupled to the vertical support members 64, 61. The vertical and horizontal support members 64, 61, 62, 63 may comprise metal suspension hangers that are electrically insulated from the first plurality of electrodes 70 using a Teflon-type material or coating. The second and third plurality of electrodes 80, 90 are supported within the pressure vessel 10 in a similar manner as the first plurality of electrodes 70.

An electric field may be generated within the pressure vessel 10 using the first and second plurality of electrodes 70, 80 that has an intensity, e.g. voltage, greater than or less than an electric field generated within the pressure vessel 10 using the second and third plurality of electrodes 80, 90. Each of the first, second, and third plurality of electrodes 70, 80, 90 may be energized to generate an electric field within the pressure vessel 10 that has an intensity that is the same as, less than, or greater than an electric field generated by another of the first, second, and third plurality of electrodes 70, 80, 90. Although only three horizontal planes of electrodes are illustrated, the system 100 may comprise any number (one or more) or arrangement of horizontal electrodes. By imposing an alternating or direct current on each of the plurality of electrodes 70, 80, 90 at different potentials, an electric field gradient is imposed between the adjacent plurality of electrodes 70, 80, 90. This electrical current gradient helps coalesce the smaller water droplets in the oil/water emulsion into larger droplets, which reach a mass having a surface area to volume ratio at which friction of adjacent oil is overcome by gravity acting on the mass, and then will settle under the force of gravity to the bottom of the pressure vessel 10. The oil/water emulsion typically includes therein water droplet sizes from about 5 microns to more than about 20 microns, but may also have submicron water droplets.

Referring back to FIG. 1, a control unit 15 monitors the voltage and/or current applied to the first, second, and third plurality of electrodes 70, 80, 90 (such as by a transducer or other similar type of measurement sensor) via one or more communication lines 17. The control unit 15 may include one or more programmable logic controllers, electronic processing units, memory, mass storage devices, input/output controls, power supplies, clocks, cache, control panels, and/or display units. The control unit 15 may include a control panel configured to provide a visual readout of the voltage and/or current applied to the first, second, and third plurality of electrodes 70, 80, 90.

The control unit 15 is configured to detect a change in the voltage or current, such as an increase above and/or a decrease below a predetermined voltage or current value, applied to any of the plurality of electrodes 70, 80, 90, and in response send a signal to actuate a valve to direct the flow of the oil/water emulsion through (1) the first distribution header 25 and the injection ports 27, (2) the second distribution header 35 and the injectors 37, or (3) both the first and second distribution headers 25, 35, the injection ports 27, and the injectors 37. For example, the control unit 15 can detect a voltage decrease (or current increase) across the third plurality of electrodes 90 when the oil/water emulsion containing a significant amount of water contacts the third plurality of electrodes 90 and thereby creates a ground path between the third plurality of electrodes 90 and the pressure vessel 10. In response, the control unit 15 sends an (electronic, visual, auditory) signal, such as to an operator and/or to a valve (e.g. flow control device 218 in FIG. 4) in communication with the control unit 15, to actuate the valve to direct the flow of the oil/water emulsion through the second distribution header 35 and the distribution injectors 37 only, and to stop the flow of the oil/water emulsion through the first distribution header 25 and the injection ports 27.

In one example, a specific quantity of an oil/water emulsion having a high solids content can be more rapidly desalted when initially injected into the pressure vessel 10 at a location between the first, second or third plurality of electrodes 70, 80, 90, compared to when initially injected into the pressure vessel 10 at a location below the first, second or third plurality of electrodes 70, 80, 90. In another example, a specific quantity of an oil/water emulsion having a high water content can be more rapidly desalted when initially injected into the pressure vessel 10 at a location below the first, second or third plurality of electrodes 70, 80, 90, compared to when initially injected into the pressure vessel 10 at a location between the first, second or third plurality of electrodes 70, 80, 90.

Referring back to FIG. 1 and FIG. 2, the system 100 includes an interface emulsion outlet 60 fluidly coupled to an emulsion outlet header 65. A portion of the oil/water emulsion, identified by reference arrows C in FIG. 1, can be removed from the pressure vessel 10 through the emulsion outlet header 65 and the interface emulsion outlet 60 in the event that the oil/water emulsion having a significant amount of water rises to an unacceptable level within the pressure vessel 10. The system 100 also includes one or more lower fluid outlets 68 coupled to the lower end of the pressure vessel 10. Water, identified by reference arrows F, separated from the oil/water emulsion is removed from the pressure vessel 10 through the lower fluid outlets 68. The system 100 further includes an upper fluid outlet 50 fluidly coupled to an upper outlet header 55. Desalted/dehydrated oil, identified by reference arrows E, from the oil/water emulsion is removed from the pressure vessel 10 through the upper outlet header 55 and the upper fluid outlet 50. To clean the pressure vessel 10 after a period of desalting of crude oil, other fluids, identified by reference arrows D, such as cleaning/backwash fluids can be supplied through a third fluid inlet 40 and injected therefrom into the pressure vessel 10 by a third distribution header 45 to clean and remove undesirable accumulates on the surfaces within the pressure vessel 10. The third distribution header 45 is positioned near the bottom of the pressure vessel 10.

According to one method of operation using the system 100, water is separated from an oil/water emulsion in the pressure vessel 10 using gravity drainage and electrostatic separation. Where the density of the water is greater than the density of the crude oil so that the water separates out from the crude oil due to gravity, water will settle or migrate to the bottom of the pressure vessel 10, while the crude oil will migrate to the top of the pressure vessel 10 over the water therein. In addition, the first, second, and third plurality of electrodes 70, 80, 90 may be used to independently generate electric fields that promote electrostatic separation of the water from the crude oil.

In operation, an oil/water emulsion, identified by reference arrows A is supplied through the first fluid inlet 20, flowed to and distributed by the first distribution header 25, and injected into the pressure vessel 10 by the injection ports 27. The oil/water emulsion is injected vertically at a location below the first, second, and third, plurality of electrodes 70, 80, 90, and initially directed along a substantially vertical plane in the direction of the first, second, and third plurality of electrodes 70, 80, 90. At the same or a different time, the same or a different oil/water emulsion, identified by reference arrows B is supplied through the second fluid inlet 30, flowed to and distributed by the second distribution header 35, and injected into the pressure vessel 10 by the distribution injectors 37. The oil/water emulsion is injected radially and initially directed along a substantially horizontal plane at a location between the first and second plurality of electrodes 70, 80 and/or between the second and third plurality of electrodes 80, 90, at the same or different flow rates and/or amounts.

The first, second, and/or third plurality of electrodes 70, 80, 90 are energized to generate (high and low intensity) electric fields, such that water droplets in the oil/water emulsion coalesce to form larger water droplets in the regions between the first and second plurality of electrodes 70, 80, and/or between the second and third plurality of electrodes 80, 90. When the oil/water emulsion is exposed to the electric fields, the larger, heavier water droplets tend to gravitate downward and separate from the oil. Specifically, since water is a polar molecule, the electric field causes each water droplet in the electric field to vibrate at the frequency of the alternating current voltage supplied to the energized electrodes 70, 80, 90 by the power source 5. The movement of the water droplets results in collisions of water droplets, resulting in the formation of large drops of water by the coalescence of many smaller water droplets. The large water droplets thus formed have sufficient mass to surface area ratio to overcome the friction/viscosity of the oil/water emulsion and fall through the oil/water emulsion and settle at, or migrate to, the bottom of the pressure vessel 10.

Coalescence of small water droplets is enhanced by increasing the electric field intensity. However, the second and/or third plurality of electrodes 80, 90 can be energized to generate an electric field having an intensity that is different than, such as less than, the intensity of an electric field generated by the first and/or second plurality of electrodes 70, 80, so that the large water droplets continue to coalesce to form even larger water droplets and further separate out from the oil without causing breakdown of these larger water droplets into smaller water droplets. As the water separates from the oil, the oil above the plurality of electrodes 70, 80, 90 can be removed from the pressure vessel 10 through the upper outlet header 55 and the upper fluid outlet 50 as identified by reference arrows E in FIG. 1, while the water can be removed from the pressure vessel 10 through the lower fluid outlets 68 as identified by reference arrows F in FIG. 1.

FIG. 4 is a schematic view of process piping and valving disposed upstream and downstream of the desalter/dehydrator system. Crude oil flows through one or more flow lines 224 from a crude oil source 205 that is in fluid communication with the first fluid inlet 20 via one or more flow lines 207 to supply crude oil into the desalter/dehydrator system 100. The crude oil source 205 is also in fluid communication with the second fluid inlet 30 via one or more flow lines 208, which are also in fluid communication with flow lines 224. A flow control device 218, such as an electronically and/or manually actuated two-way or three-way valve, can be selectively actuated (manually by an operator and/or automatically by the control unit 15 via communication line 19) to open and close fluid flow into the flow lines 207 and the flow lines 208. The flow control device 218 is configured to direct fluid flow into the flow lines 207 only, the flow lines 208 only, or simultaneously into both of the flow lines 207, 208. The flow control device 218 can include a control unit similar to the control unit 15.

Water that is removed from the pressure vessel 10 through the lower fluid outlets 68 can be directed to a fluid reservoir 215 through one or more flow lines 212 and/or directed to flow lines 224 via one or more flow lines 214 to mix with the crude oil flowing into flow lines 207, 208, thereby forming an oil/water emulsion of the desired oil to water ratio. The water flowing through flow lines 212, 214 can also be directed by a pumping device 221 through one or more flow lines 211 into the third fluid inlet 40 to wash out the interior of the pressure vessel 10 during maintenance and/or cleaning operations. In addition or alternatively, one or more separate water sources can be used to supply water that is mixed with the crude oil flowing through flow lines 224 to form the oil/water emulsion and/or to supply water into the third fluid outlet 40 for maintenance and/or cleaning operations. A chemical source 210 is in fluid communication with the flow lines 224 via one or more flow lines 213 to supply chemicals that are mixed with the crude oil that can help react out or break out contaminants in the crude oil to improve desalting efficiency of the system 100.

A fluid flow monitoring device 220 is in fluid communication with the flow line 224 to monitor the flow characteristics, such as volumetric flow rate, mass flow rate, and/or pressure drop, of the oil/water emulsion flowing through the flow line 224. The fluid flow monitoring device 220 can provide a visual and/or electronic indication to an operator of the desalter/dehydrator system 100 regarding the flow characteristics of the oil/water emulsion, which information can be used along with other electrical indications (e.g. voltage and/or current increase and/or decrease) by the operator and/or the control unit 15 to actuate the flow control device 218 to select the first fluid inlet 20, the second fluid inlet 30, or both to inject the oil/water emulsion into the pressure vessel 10 to maximize the efficiency of the system 100. In one example, an oil/water emulsion having a high solids content can have flow characteristics that are different than flow characteristics of an oil/water emulsion having a high water content, which information can be used to actuate the flow control device 218 to direct the oil/water emulsion to either the first fluid inlet 20, so that the oil/water emulsion is injected into the pressure vessel 10 at a location below the electric fields generated by the electrodes 70, 80, 90, or the second fluid inlet 30 so that the oil/water emulsion is injected into the pressure vessel 10 at a location within the electric fields generated by the electrodes 70, 80, 90, or both fluid inlets to maximize the desalting efficiency of the system 100.

Oil separated from an oil/water emulsion injected into the pressure vessel 10 can be removed from the pressure vessel 10 through the upper fluid outlet 50 and directed to a refining device 225, such as a distillation tower, via one or more flow lines 209. Crude oil supplied from the crude oil source 205 can be directed from flow lines 224 to flow lines 206 and then to flow lines 209, thereby by-passing the desalter/dehydrator system 100 and flowing directly to another desalting system when the desalting system 100 is being service, repaired, and/or cleaned, or the refining device 225 upstream of the desalter/dehydrator system 100 if desired by an operator. As illustrated in FIG. 4, each of the flow lines coupled upstream and downstream of the pressure vessel 10 can include one or more flow control devices, such as valves, pumps, chokes, etc., as needed to help control the flow of fluids flowing through the flow lines into and out of the pressure vessel 10.

While the foregoing is directed to certain embodiments, other and further embodiments may be devised without departing from the basic scope thereof, and the scope thereof is determined by the claims that follow.

The invention claimed is:

1. A desalter/dehydrator system, comprising:
   a pressure vessel having a top end and a bottom end;
   a first plurality of electrodes and a second plurality of electrodes positioned below the first plurality of electrodes configured to generate an electric field within the pressure vessel;
   a first fluid inlet extending through the top end;
   a first distribution header coupled to the first fluid inlet, wherein the first distribution header is disposed within the pressure vessel and configured to inject an oil/water emulsion into the pressure vessel at a location within the electric field generated within the pressure vessel;

a second fluid inlet extending through the bottom end;

a second distribution header coupled to the second fluid inlet, wherein the second distribution header is disposed within the pressure vessel and configured to inject the same or a different oil/water emulsion into the pressure vessel at a location below all of the electrodes disposed within the pressure vessel;

a control unit in communication with a flow control device that is configured to control fluid flow into the first distribution header only, the second distribution header only, and simultaneously into both the first and second distribution headers, wherein the control unit is configured to communicate a signal to actuate the flow control device in response to a voltage decrease or a current increase applied to the second plurality of electrodes caused by a ground path created by water within the pressure vessel that extends between the second plurality of electrodes and a wall of the pressure vessel to direct fluid flow through the first distribution header only and stop fluid flow through the second distribution header;

a power source to supply power to one or more of the first plurality of electrodes or the second plurality of electrodes via a first communication line coupled to the power source, wherein the first communication line extends through the wall of the pressure vessel; and at least one sensor coupled to the second plurality of electrodes, wherein the at least one sensor is configured to measure a voltage or a current applied to the second plurality of electrodes and communicate the measured voltage or the measured current to the control unit via a second communication line coupled to the control unit to detect the voltage decrease or the current increase, wherein the second communication line extends through the wall of the pressure vessel.

2. The system of claim 1, further comprising a distribution injector in fluid communication with the first distribution header and configured to inject the oil/water emulsion at a location between the first plurality of electrodes and the second plurality of electrodes.

3. The system of claim 2, wherein the distribution injector is configured to inject the oil/water emulsion at a location between the second plurality of electrodes and a third plurality of electrodes.

4. The system of claim 3, further comprising a plurality of injectors in fluid communication with the second distribution header and configured to inject the oil/water emulsion at a location below the third plurality of electrodes.

5. A desalter/dehydrator system, comprising:
a pressure vessel having a top end and a bottom end;
a plurality of electrodes configured to generate an electric field within the pressure vessel;
a first fluid inlet extending through the top end;
an upper distribution header coupled to the first fluid inlet, wherein the upper distribution header is located above the plurality of electrodes and having one or more distribution injectors at least partially positioned within a location between the plurality of electrodes, wherein the one or more distribution injectors are configured to inject an oil/water emulsion into the pressure vessel at a location within the electric field;

a second fluid inlet extending through the bottom end;

a lower distribution header coupled to the second fluid inlet, wherein the lower distribution header is located below all of the electrodes disposed within the pressure vessel and having one or more injection ports configured to inject the same or a different oil/water emulsion into the pressure vessel at a location below all of the electrodes disposed within the pressure vessel;

a control unit in communication with a flow control device that is configured to control fluid flow into the upper distribution header only, the lower distribution header only, and simultaneously into both the upper and lower distribution headers, wherein the control unit is configured to communicate a signal to actuate the flow control device in response to a voltage decrease or a current increase applied to any one of the plurality of electrodes caused by a ground path created by water within the pressure vessel that extends between the plurality of electrodes and a wall of the pressure vessel to inject the oil/water emulsion through the upper distribution header only and stop injection of the same or the different oil/water emulsion through the lower distribution header;

a power source to supply power to the plurality of electrodes via a first communication line coupled to the power source, wherein the first communication line extends through the wall of the pressure vessel; and one or more sensors coupled to the plurality of electrodes, wherein the one or more sensors are configured to measure a voltage or a current applied to the plurality of electrodes and communicate the measured voltage or the measured current to the control unit via a second communication line coupled to the control unit to detect the voltage decrease or the current increase, wherein the second communication line extends through the wall of the pressure vessel.

6. The system of claim 5, wherein the voltage decrease or the current increase is a decrease below or an increase above a predetermined voltage or current value.

7. The system of claim 5, wherein the plurality of electrodes comprises a first plurality of electrodes and a second plurality of electrodes, and wherein the one or more distribution injectors are at least partially positioned between the first plurality of electrodes and the second plurality of electrodes.

8. The system of claim 3, further comprising a plurality of injection ports formed in the second distribution header and configured to inject the oil/water emulsion at a location below the third plurality of electrodes.

* * * * *